(12) United States Patent
Kim et al.

(10) Patent No.: US 12,257,122 B2
(45) Date of Patent: Mar. 25, 2025

(54) METHOD OF GENERATING THREE DIMENSIONAL MODEL USING VIRTUAL BRIDGE BASED MULTI INPUT BOOLEAN OPERATION

(71) Applicant: IMAGOWORKS INC., Seoul (KR)

(72) Inventors: Youngjun Kim, Seoul (KR); Tae-geun Son, Seoul (KR); Jinhyeok Choi, Seoul (KR); Taeseok Lee, Seongnam-si (KR)

(73) Assignee: IMAGOWORKS INC., Seoul (KR)

( * ) Notice: Subject to any disclaimer, the term of this patent is extended or adjusted under 35 U.S.C. 154(b) by 885 days.

(21) Appl. No.: 17/330,361

(22) Filed: May 25, 2021

(65) Prior Publication Data

US 2022/0160477 A1    May 26, 2022

(30) Foreign Application Priority Data

Nov. 20, 2020 (KR) .................. 10-2020-0157014
Dec. 22, 2020 (WO) ............ PCT/KR2020/018845

(51) Int. Cl.
*A61C 7/00* (2006.01)
*A61C 13/00* (2006.01)
(Continued)

(52) U.S. Cl.
CPC .............. *A61C 7/002* (2013.01); *G06F 30/20* (2020.01); *G09B 23/30* (2013.01); *A61C 13/0004* (2013.01); *B29C 64/386* (2017.08)

(58) Field of Classification Search
CPC ................................ A61C 7/002; G06F 30/20
See application file for complete search history.

(56) References Cited

U.S. PATENT DOCUMENTS

| 2016/0374784 A1* | 12/2016 | Joshi | A61C 13/082 |
| | | | 433/214 |
| 2018/0263726 A1* | 9/2018 | Fares | B33Y 80/00 |

(Continued)

FOREIGN PATENT DOCUMENTS

| JP | H07306888 A | 11/1995 |
| JP | 2017006658 A | 1/2017 |
| JP | 2020513200 A | 5/2020 |

OTHER PUBLICATIONS

European Search Report dated Apr. 6, 2022.
(Continued)

*Primary Examiner* — Shivang I Patel
(74) *Attorney, Agent, or Firm* — LEEPI

(57) ABSTRACT

A method of generating a 3D model for digital dentistry using a virtual bridge based multi input Boolean operation, includes generating a first group model by generating a first virtual bridge connecting models spaced apart from each other among first input models of a first input group when the models are spaced apart from each other among the first input models, generating a second group model by generating a second virtual bridge connecting models spaced apart from each other among second input models of a second input group when the models are spaced apart from each other among the second input models, generating a first result model by a Boolean operation of the first group model and the second group model and removing a remaining first virtual bridge or a remaining second virtual bridge when the first virtual bridge or the second virtual bridge remains in the first result model.

20 Claims, 24 Drawing Sheets

(51) Int. Cl.
*B29C 64/386* (2017.01)
*G06F 30/20* (2020.01)
*G09B 23/30* (2006.01)

(56) References Cited

U.S. PATENT DOCUMENTS

2020/0078143 A1   3/2020  Schulter et al.
2020/0170764 A1*  6/2020  Schulter ............... A61C 13/102

OTHER PUBLICATIONS

International Search Report dated Aug. 9, 2021.
Guo-Dong Yan et al., "The Computer-Aided Design and Rapid Prototyping Fabrication of Removable Partial Denture Framework" Computer Science and Information Technology, 2009, 2nd IEEE International Conference On, IEEE, Piscataway, NJ, USA, Aug. 9, 2009.

* cited by examiner

Result

Step 1

Step 2

Step 3

Step 4

Step 5

Step 6

Step 7

Step 8

Boolean model if bridge is not deleted

Boolean model if bridge is deleted

Final boolean model for digital dentistry

METHOD OF GENERATING THREE DIMENSIONAL MODEL USING VIRTUAL BRIDGE BASED MULTI INPUT BOOLEAN OPERATION

PRIORITY STATEMENT

This application claims priority under 35 U.S.C. § 119 to Korean Patent Application No. 10-2020-0157014, filed on Nov. 20, 2020 in the Korean Intellectual Property Office (KIPO) and International Patent Application No. PCT/KR2020/018845 filed on Dec. 22, 2020, the contents of which are herein incorporated by reference in their entireties.

BACKGROUND

1. Technical Field

Embodiments relate to a method of generating a three dimensional (3D) model for a digital dentistry using a virtual bridge based multi input Boolean operation. More particularly, embodiments relate to a method of generating a 3D model for a digital dentistry using a virtual bridge based multi input Boolean operation connecting plural models with a virtual bridge.

2. Description of the Related Art

A Boolean operation of a 3D model is an operation that converts two inputted 3D models into one new 3D model through a logical operation. Referring to FIG. 1, the Boolean operation may include Union operation (A∪B) of a model A and a model B containing all areas in the model A and the model B, Intersection operation (A∩B) of a model A and a model B containing all areas that are both in the model A and the model B, Difference operation (A∩B$^C$,B∩A$^C$) of a model A and a model B containing areas that are in the model A but not in the model B (A−B) or areas that are in the model B but not in the model A (B−A) and Symmetric difference operation (A$^C$∪B$^C$) of a model A and a model B containing areas that belong either to the model A or to the model B but not to the both of the model A and the model B.

The Boolean operation is an essential function for CAD software because it is possible to generate a desired model by adding or removing only necessary areas with only the existing 3D model. The Boolean operation is widely used in most fields dealing with 3D models such as a product design, a 3D medical image generation and a 3D printing model design.

The Boolean operation is performed on two 3D models so that the Boolean operation is defined as a one-to one operation. However, the Boolean operations may be required to be repeatedly performed on several 3D models in digital dentistry software.

SUMMARY

Embodiments provide a method of generating a three dimensional (3D) model for a digital dentistry using a virtual bridge based multi input Boolean operation. More particularly, embodiments provide a method of generating a 3D model for a digital dentistry using a virtual bridge based multi input Boolean operation connecting plural models spaced apart from each other using the virtual bridge to perform a multi input Boolean operation at once to simplify the Boolean operation.

In an example method of generating a 3D model for a digital dentistry using a virtual bridge based multi input Boolean operation according to the present inventive concept, the method includes generating a first group model by generating a first virtual bridge connecting models spaced apart from each other among first input models of a first input group when the models are spaced apart from each other among the first input models, generating a second group model by generating a second virtual bridge connecting models spaced apart from each other among second input models of a second input group when the models are spaced apart from each other among the second input models, generating a first result model by a Boolean operation of the first group model and the second group model and removing a remaining first virtual bridge or a remaining second virtual bridge when the first virtual bridge or the second virtual bridge remains in the first result model.

In an embodiment, when all of the first input models are connected, the first group model may not include the first virtual bridge. When all of the second input models are connected, the second group model may not include the second virtual bridge.

In an embodiment, the first virtual bridge may be set to connect all of the models spaced apart from each other among the first input models at least once, and minimize a length of a connection path.

In an embodiment, the generating the first virtual bridge may include calculating all combinations of closest points between the models spaced apart from each other among the first input models and spaced distances between the closest points between the models spaced apart from each other among the first input models.

In an embodiment, the generating the first virtual bridge may further include arranging the spaced distances in ascending order, generating an initial unit bridge at a position corresponding to a minimum value among the spaced distances and sequentially searching the spaced distances to p10 which are arranged in ascending order.

In an embodiment, the generating the first virtual bridge may further include generating an additional unit bridge at a position corresponding to a searched spaced distance when a unit bridge is generated in one of two models corresponding to the searched spaced distance and a unit bridge is not generated in the other model.

In an embodiment, the generating the first virtual bridge may further include not generating an additional unit bridge at a position corresponding to a searched spaced distance when unit bridges are generated in both of two models corresponding to the searched spaced distance.

In an embodiment, the generating the first virtual bridge may further include not generating an additional unit bridge at a position corresponding to a searched spaced distance and setting the searched spaced distance to a bridge candidate position when unit bridges are not generated in both of two models corresponding to the searched spaced distance.

In an embodiment, the generating the first virtual bridge may further include generating octrees of the models spaced apart from each other among the first input models to calculate the combinations of the closest points between the models spaced apart from each other among the first input models.

In an embodiment, the spaced distances between the closest points between the models spaced apart from each other among the first input models may be represented as $p = \min_{(i,j) \in C(n,2)} (d_{(i,j)})$. $d(i,j)$ may represent a distance between Model i and Model j, the number of the models spaced apart from each other among the first input models may be n and C(2,n) may represent a combination operation to select two models among the n spaced models.

In an embodiment, a unit bridge connecting models spaced apart from each other among the first input models or the second input models may have a triangular bipyramid shape.

In an embodiment, a shape of the unit bridge may be defined by $\vec{v}_1$, $\vec{v}_2$ and $\vec{v}_3$. When two models spaced apart from each other are Model a and Model b, two closest points between the model a and the model b may be defined as q1 and q2. $\vec{v}_1 = q_1 - q_2$, $\vec{v}_2$ may be an arbitrary vector and $\vec{v}_3 = (\vec{v}_1 \times \vec{v}_2) \times \vec{v}_1$.

In an embodiment, when $$q_3 = \frac{q_1 + q_2}{2},$$
$$q_4 = q_3 + k\vec{v_3},$$

k is a constant, q5 is a point where q4 is rotated 120 degrees with the vector $\vec{v}_1$ around q3 and q6 is a point where q4 is rotated 120 degrees with the vector $\vec{v}_1$ around q3, a first triangular pyramid of the triangular bipyramid shape may be defined as q1, q4, q5, and q6, and a second triangular pyramid of the triangular bipyramid shape may be defined as q2, q4, q5, and q6.

In an embodiment, the first input group may include a guide base having a shape corresponding to a shape of a patient's teeth to be placed on the patient's teeth, and a plurality of sleeve mounts connected to the guide base and protruded from the guide base. The second input group may include a plurality of sleeve tools corresponding to the sleeve mounts and spaced apart from each other.

In an embodiment, the second input group may further include the second virtual bridge connecting the sleeve tools spaced apart from each other.

In an embodiment, the first result model may be generated by Difference operation on the second group model from the first group model. The first result model may include the guide base and the sleeve mounts disposed on the first result model. Holes corresponding to the sleeve tools may be respectively formed in the sleeve mounts.

In an embodiment, the first input group may further include a support bar connected to the sleeve mounts. Union operation may be performed on the support bar and the sleeve mounts.

In an embodiment, the first input group may further include a text model disposed on the guide base. Union operation may be performed on the text model and the guide base.

In an embodiment, the first input group may include a guide base having a shape corresponding to a shape of a patient's teeth to be placed on the patient's teeth. The second input group may include a plurality of window tools overlapped with the guide base. The second input group may further include the second virtual bridge connecting the window tools spaced apart from each other. The first result model may be generated by Difference operation on the second group model from the first group model. The first result model may include the guide base. Holes corresponding to the window tools may be formed in the guide base.

In an example method of generating a 3D model for a digital dentistry using a virtual bridge based multi input Boolean operation according to the present inventive concept, the method includes generating a first group model by generating a first virtual bridge connecting models spaced apart from each other among first input models of a first input group when the models are spaced apart from each other among the first input models, generating a first result model by a Boolean operation of the first group model and a second input model and removing a remaining virtual bridge when the virtual bridge remains in the first result model.

In an embodiment of a non-transitory computer-readable recording medium according to the present inventive concept, the non-transitory computer-readable recording medium has recorded thereon at least one program comprising commands, which when executed by a computer, performs the method of generating a 3D model for a digital dentistry using a virtual bridge based multi input Boolean operation.

According to the method of generating a 3D model for a digital dentistry using a virtual bridge based multi input Boolean operation of the present inventive concept, the plural models spaced apart from each other are connected using the virtual bridge to perform a multi input Boolean operation at once. Thus, the Boolean operation with a large number of models may be simplified. In addition, it is possible to prevent situations where the desired final result is not obtained because the result of the Boolean operations varies according to the order of the Boolean operations.

Therefore, the Boolean operations on multiple input models occurred in a digital dentistry may be stably performed, a manufacturing process of the 3D model for the digital dentistry may be simplified and an accuracy of the 3D model for the digital dentistry may be enhanced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE EMBODIMENTS

Figure 1:
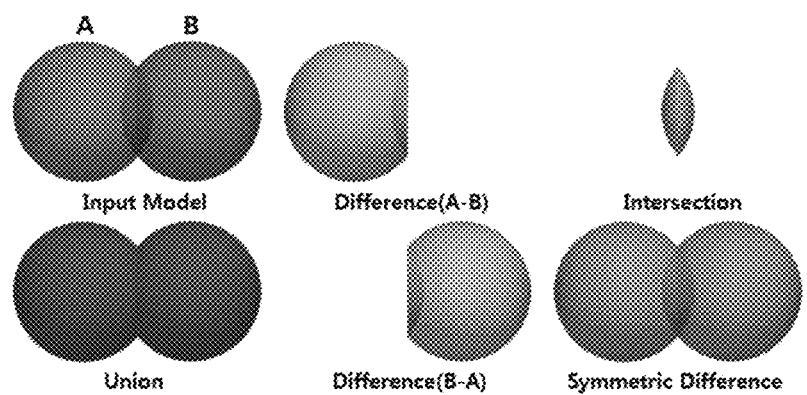
FIG. 1 is a conceptual diagram illustrating Boolean operations for an input model A and an input model B.

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings. The same reference numerals are used for the same elements in the drawings, and duplicate explanations for the same elements may be omitted.

Figure 2:
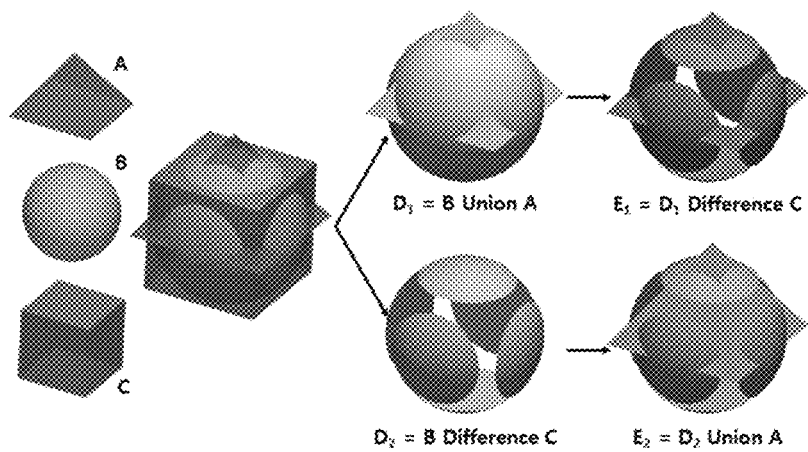
FIG. 2 is a conceptual diagram illustrating final results of Boolean operations of an input model A, an input model B and an input model C according to an order of the Boolean operations.

FIG. 1 is a conceptual diagram illustrating Boolean operations for an input model A and an input model B. FIG. 2 is a conceptual diagram illustrating final results of Boolean operations of an input model A, an input model B and an input model C according to an order of the Boolean operations.

Referring to FIGS. 1 and 2, the Boolean operation of a three dimensional (3D) model is an operation which generates a new 3D model through a logical operation on two input 3D models. The Boolean operation may include a union operation ($A \cup B$), an intersection operation ($A \cap B$) a difference operation ($A \cap B^C, B \cap A^C$) and a symmetric difference operation ($A^C \cup B^C$) and so on.

The Boolean operation is basically based on a one-to-one operation so that conventional software only provides a one-to-one Boolean operation function for two 3D models. Thus, in order to perform the Boolean operation on several models more than two models, the Boolean operations may be sequentially and repeatedly operated to obtain the result. However, the repeated Boolean operation may decrease a user convenience. In addition, when the order of the Boolean operations is changed, the final result may be changed so that the desired result may not be obtained as shown in FIG. 2.

As shown in an upper portion of FIG. 2, D1 is generated by Union operation of A and B, and then E1 is obtained by Difference operation by C from D1 (D1−C). As shown in a lower portion of FIG. 2, D2 is generated by Difference operation by C from B (B−C) and then E2 is obtained by Union operation of D2 and A. In this way, when the orders of the Boolean operations are different, the final results E1 and E2 may be different from each other.

In the present embodiment, the input modes are connected to each other by virtual bridges so that a many-to-many Boolean operation may be stably performed for multiple input models frequently occurred in a digital dentistry environment.

Figure 3:
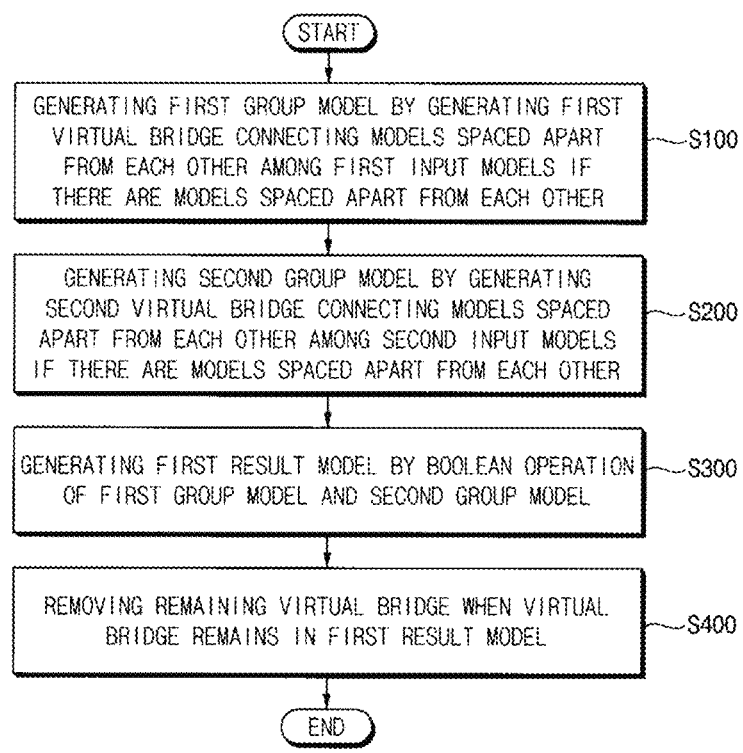
FIG. 3 is a flowchart diagram illustrating a method of generating a three dimensional (3D) model for a digital dentistry using a virtual bridge based multi input Boolean operation according to an embodiment of the present inventive concept.

FIG. 3 is a flowchart diagram illustrating a method of generating a 3D model for a digital dentistry using a virtual bridge based multi input Boolean operation according to an embodiment of the present inventive concept.

Referring to FIG. 3, multiple models may be grouped into two input groups for the Boolean operation. For example, a first input group may include a plurality of first input models. For example, a second input group may include a plurality of second input models.

A first Boolean operation is performed on input models intersecting each other among the first input models. The first Boolean operation may be Union operation. Through the first Boolean operation, the input models which are intersect each other in the first input group are combined with each other so that all input models in the first input group do not intersect each other and are spaced apart from each other. If there are no models spaced apart from each other among the first input models after the first Boolean operation, all the input models in the first input group are connected through the first Boolean operation to generate a first group model without a virtual bridge.

If there are models spaced apart from each other among the first input models after the first Boolean operation, a first group model may be generated by generating a first virtual bridge connecting the models spaced apart from each other among the first input models (operation S100).

When the first input models in the first group model are connected by the first virtual bridge, the first group model may become one connected model.

When there are no models spaced apart from each other among the first input models and all of the first input models are connected in an initial state, the first group model may not include the first virtual bridge.

For example, Union operation may be performed on all of the first input models to generate the first group model. For example, Union operation may be performed on all of the first input models and the first virtual bridge to generate the first group model.

The first Boolean operation is performed on input models intersecting each other among the second input models. The first Boolean operation may be Union operation. Through the first Boolean operation, the input models which are intersect each other in the second input group are combined with each other so that all input models in the second input group do not intersect each other and are spaced apart from each other. If there are no models spaced apart from each other among the second input models after the first Boolean operation, all the input models in the second input group are connected through the first Boolean operation to generate a second group model without a virtual bridge.

If there are models spaced apart from each other among the second input models after the first Boolean operation, a second group model may be generated by generating a second virtual bridge connecting the models spaced apart from each other among the second input models (operation S200).

When there are no models spaced apart from each other among the second input models and all of the second input models are connected in an initial state, the second group model may not include the second virtual bridge.

For example, Union operation may be performed on all of the second input models to generate the second group model. For example, Union operation may be performed on all of the second input models and the second virtual bridge to generate the second group model.

When the first group model is one connected model and the second group model is one connected model by the operation S100 and S200 or initially, the Boolean operation may be performed on the first group model and the second group model (operation S300). A result of the Boolean operation on the first group model and the second group model may be referred to a first result model.

When the first virtual bridge or the second virtual bridge remains in the first result model, the remaining first virtual bridge or the remaining second virtual bridge may be removed (operation S400). The first virtual bridge and the second virtual bridge are structures generated only to simplify the Boolean operation and are not necessary parts for a final model so that the first virtual bridge or the remaining second virtual bridge may be removed when the first virtual bridge or the second virtual bridge remains after the Boolean operation. According to the first input models, the second input models and the type of the Boolean operation, the virtual bridge may or may not exist in the first result model. When the virtual bridge does not exist in the first result model, the operation (operation S400) of removing the virtual bridge may be omitted.

Although the first group model includes a plurality of the first input models and the second group model includes a plurality of the second input models in the present embodiment, the present inventive concept may not be limited thereto.

For example, the first group model may include the plurality of the first input models. When there are models spaced apart from each other among the first input models, the first group model may include the first virtual bridge. In contrast, for example, the second input model may be one model rather than include a plurality of models. Herein, the first result model may be generated by performing the Boolean operation on the first group model and the second input model.

FIGS. 4 to 15 are conceptual diagrams illustrating a method of determining positions and a path of virtual bridges of an embodiment of the present inventive concept.

Referring to FIGS. 1 to 15, after the first Boolean operation is performed on input models connected to each other to generate the first group model and the second group model, it is ensured that existing input models (or existing groups of the connected input models) in each of the group models do not intersect each other and are spaced apart from each other. An element connecting all of the existing input models (or the existing groups of the connected input models) spaced apart from each other in the each of the group models like a bridge may be defined as a virtual bridge.

A virtual bridge which connects two models included in the same group is generated as a 3D model which connects the closest points between the two models to prevent an intersection between the virtual bridge and another existing model. A detailed method of generating the virtual bridge is as follows.

The first virtual bridge may be set to connect all of the models spaced apart from each other among the first input models at least once, and minimize a length of a connection path. In the same way, the second virtual bridge may be set to connect all of the models spaced apart from each other among the second input models at least once, and minimize a length of a connection path. Herein, the first virtual bridge may mean a set of unit bridges generated in an entire path connecting all of the models spaced apart from each other among the first input models. Each bridges included in the entire path may be referred to a unit bridge.

The operation of generating the first virtual bridge includes calculating all combinations of closest points between the models spaced apart from each other and spaced distances between the closest points between the models spaced apart from each other.

To calculate the combinations of the closest points between the models spaced apart from each other, octree of the models may be generated. The octree may mean a structure in which each of the models is divided into cells of a small size. To derive the closest points between the spaced models, a load of calculation may be greatly reduced by calculating only distances between representative positions of the cells.

Distances of the closest points between all spaced models (n) in the same group are represented as $p=\min_{(i,j)\in C(n,2)}(d_{(i,j)})$. $d(i,j)$ represents a distance between Model i and Model j. The number of the spaced models is n. $C(2,n)$ represents a combination operation to select two models among the n spaced models.

Figure 4:
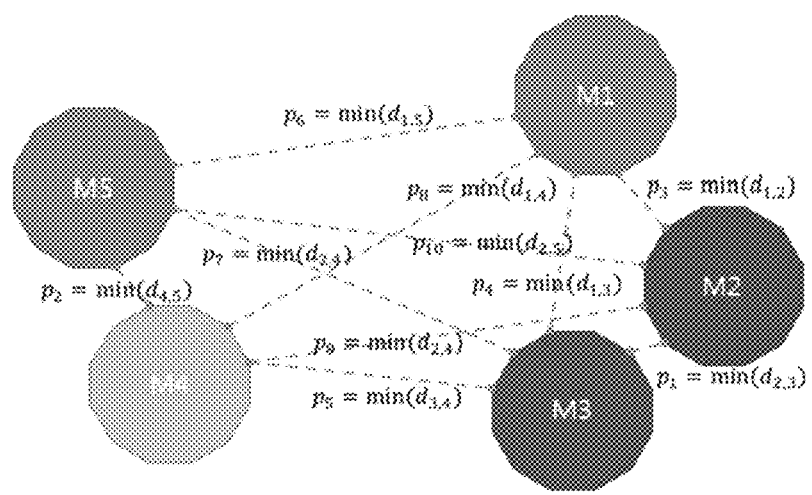
FIGS. 4 to 15 are conceptual diagrams illustrating a method of determining positions and a path of virtual bridges of an embodiment of the present inventive concept.

In FIG. 4, the first group model includes five first input models. The five first input models are referred to M1, M2, M3, M4 and M5, respectively. The result of the combination operation for selecting two of the five first input models is (5*4)/(2*1), so it is 10.

The shortest distance p between the five first input models includes ten p values p1 to p10. The ten p values are written in FIG. 4.

The operation of generating the first virtual bridge may include arranging the spaced distances p1 to p10 in ascending order. In FIG. 4, p1 to p10 represents the p values which are designated in ascending order.

Figure 5:
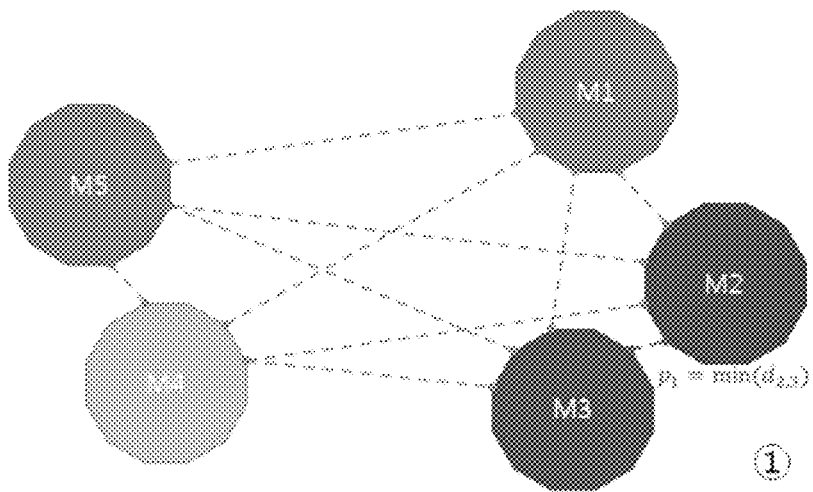
Figure 6:
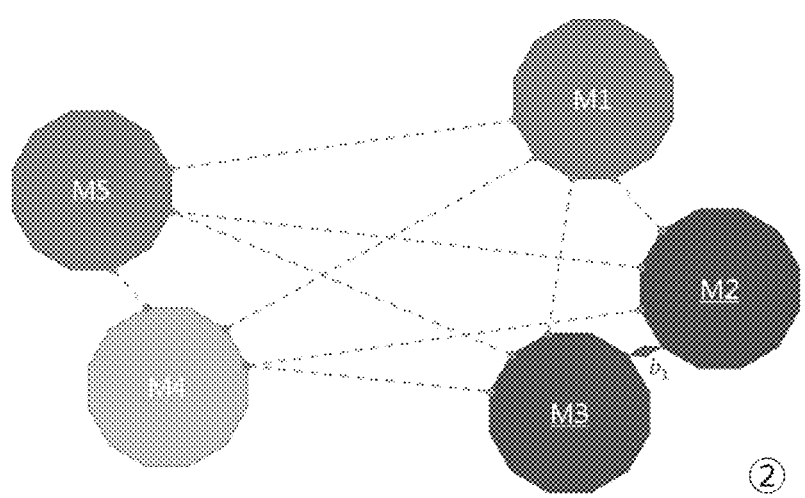

As shown in FIGS. 5 and 6, an initial unit bridge (e.g. b1) is generated at a position (e.g. p1=min(d2,3)) corresponding to a minimum value among the spaced distances p1 to p10. Then the spaced distances p2 to p10 which are arranged in ascending order are sequentially searched. Model M2 and Model M3 are connected to each other through the initial unit bridge b1.

When a unit bridge is already generated in one of the two models corresponding to a next searched spaced distance in ascending order and a unit bridge is not yet generated in the other model, an additional unit bridge may be generated at a position corresponding to the next searched spaced distance.

When unit bridges are already generated in both of two models corresponding to a next searched spaced distance in ascending order, an additional unit bridge may not be generated at the position corresponding to the next searched spaced distance.

When unit bridges are not yet generated in both of two models corresponding to a next searched spaced distance in ascending order, an additional unit bridge may not be generated at the position corresponding to the next searched spaced distance and the position corresponding to the next searched spaced distance may be set to a bridge candidate position.

In FIGS. 5 to 15, model numbers of models connected to other models are underlined and model numbers of models which are not yet connected to other models are not underlined.

Figure 7:
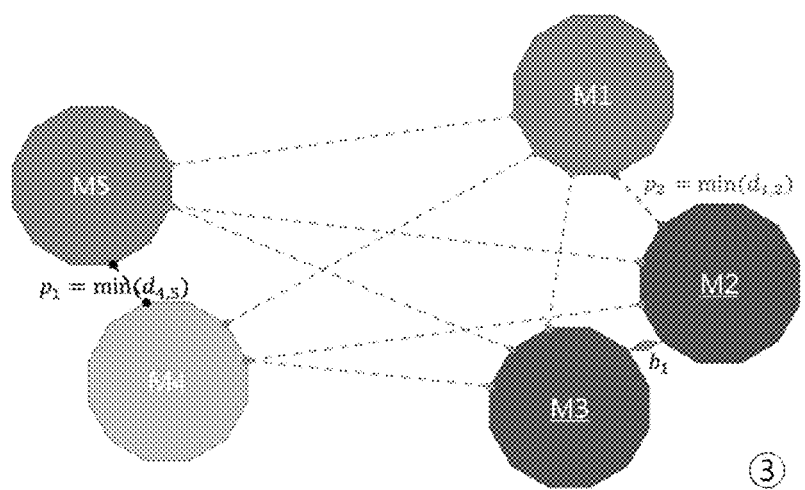

When the initial unit bridge (e.g. b1) is generated at the position corresponding to the minimum value (e.g. p1) among the spaced distances p1 to p10, a list of the spaced distances may be updated. As shown in FIGS. 6 and 7, p1=min(d2,3) where the unit bridge b1 is generated may be removed from the list. In addition, p2 to p10 of FIG. 4 may be changed to p1 to p9 in FIG. 7. In FIGS. 6 and 7, remaining nine spaced distances are illustrated in dotted line corresponding to the updated list.

In FIG. 7, a minimum value p1=min(d4,5) is searched among the updated spaced distances p1 to p9 and unit bridges are not yet generated in both of two models M4 and M5 corresponding to the searched spaced distance p1=min(d4,5) so that an additional unit bridge may not be generated at the position corresponding to the searched spaced distance p1=min(d4,5) and the position corresponding to the searched spaced distance p1=min(d4,5) may be set to a bridge candidate position. Then, the updated spaced distances p2 to p9 which are arranged in ascending order are sequentially searched.

Figure 8:
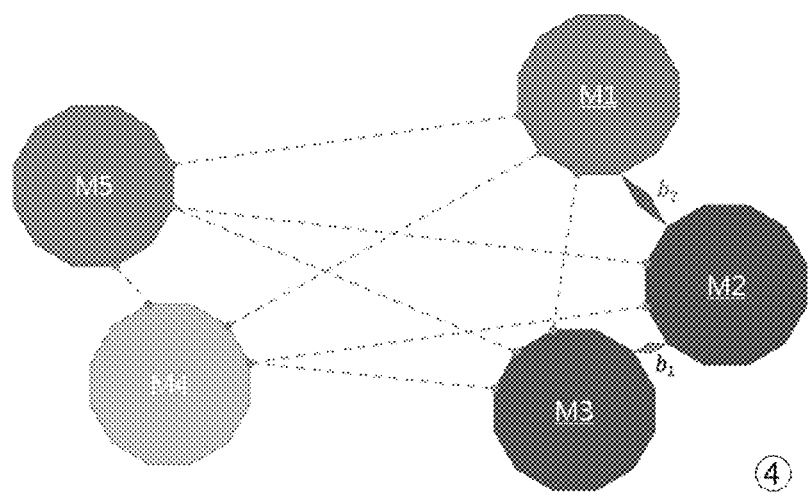

In FIG. 7, a second minimum value p2=min(d1,2) is searched among the updated spaced distances p1 to p9 and a unit bridge is already generated in one (e.g. M2) of the two models corresponding to the searched spaced distance p2=min(d1,2) and a unit bridge is not yet generated in the other model (e.g. M1) so that an additional unit bridge (e.g. b2) may be generated at the position corresponding to the searched spaced distance p2=min(d1,2) as shown in FIG. 8.

Figure 9:
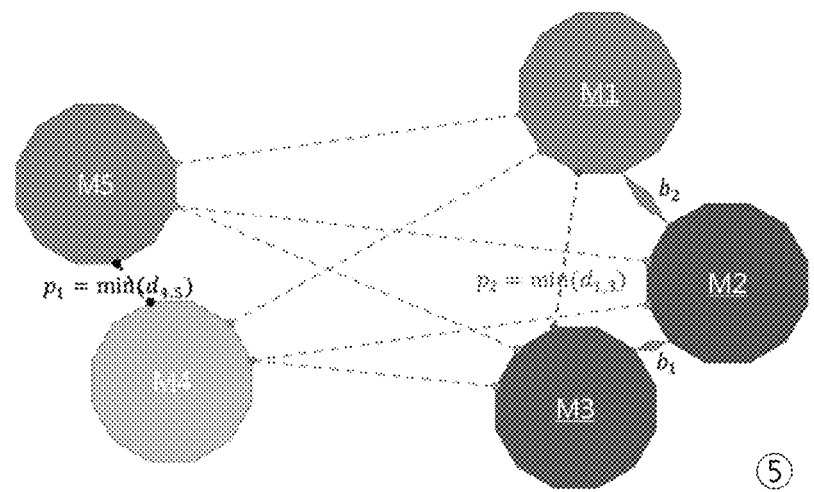

When the additional unit bridge (e.g. b2) is generated, the list of the spaced distances may be updated. As shown in FIGS. 8 and 9, p2=min(d1,2) where the unit bridge b2 is generated may be removed from the list. In addition, p1, p3 to p9 of FIG. 7 may be changed to p1 to p8 in FIG. 9. In FIGS. 8 and 9, remaining eight spaced distances are illustrated in dotted line corresponding to the updated list.

In FIG. 9, a minimum value p1=min(d4,5) is searched among the updated spaced distances p1 to p8 and unit bridges are still not yet generated in both of two models M4 and M5 corresponding to the searched spaced distance p1=min(d4,5) so that an additional unit bridge may not be generated at the position corresponding to the searched spaced distance p1=min(d4,5) and the position corresponding to the searched spaced distance p1=min(d4,5) may be set to the bridge candidate position. Then, the updated spaced distances p2 to p8 which are arranged in ascending order are sequentially searched.

In FIG. 9, a second minimum value p2=min(d1,3) is searched among the updated spaced distances p1 to p8 and the unit bridges b1 and b2 are already generated in both of two models M1 and M3 corresponding to the searched spaced distance p2=min(d1,3) so that an additional unit bridge may not be generated at the position corresponding to the searched spaced distance p2=min(d1,3).

Figure 10:
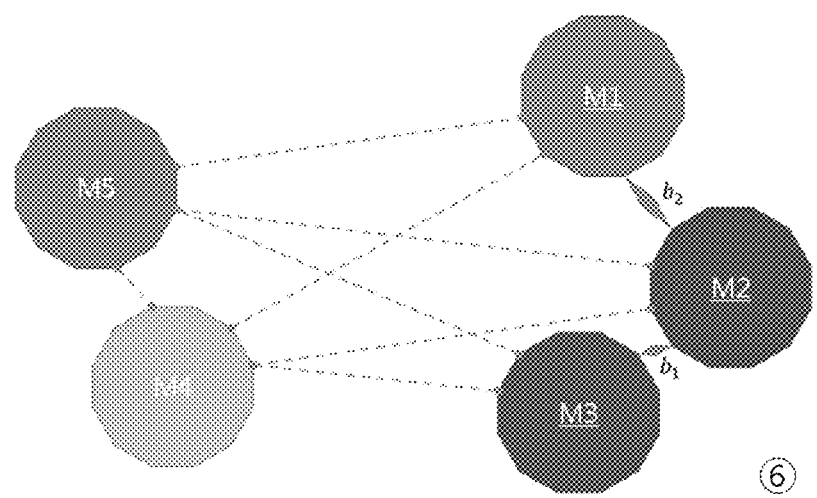
Figure 11:
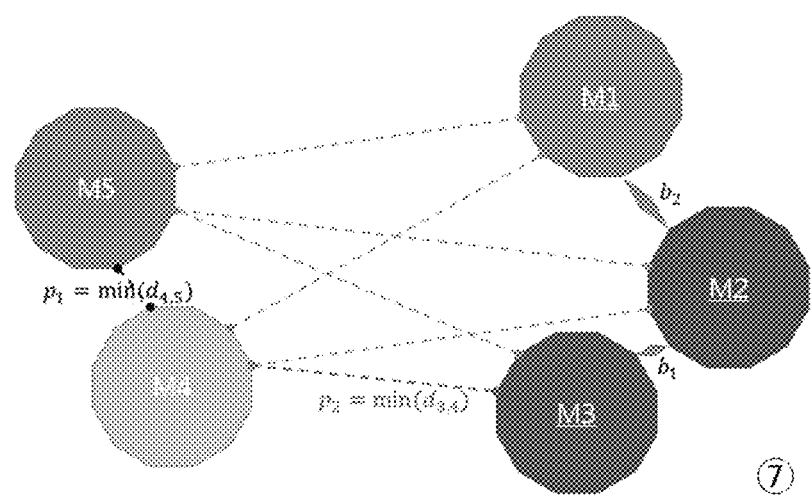

When the unit bridges b1 and b2 are already generated in both of two models M1 and M3 corresponding to the searched spaced distance p2=min(d1,3), the searched spaced distance p2=min(d1,3) corresponding two models M1 and M3 already having the unit bridges b1 and b2 may be removed from the list. As shown in FIGS. 10 and 11, p2=min(d1,3) may be removed from the list. In addition, p1, p3 to p8 of FIG. 9 may be changed to p1 to p7 in FIG. 11. In FIGS. 10 and 11, remaining seven spaced distances are illustrated in dotted line corresponding to the updated list.

In FIG. 11, a minimum value p1=min(d4,5) is searched among the updated spaced distances p1 to p7 and unit bridges are still not yet generated in both of two models M4 and M5 corresponding to the searched spaced distance p1=min(d4,5) so that an additional unit bridge may not be generated at the position corresponding to the searched spaced distance p1=min(d4,5) and the position corresponding to the searched spaced distance p1=min(d4,5) may be set to the bridge candidate position. Then, the updated spaced distances p2 to p7 which are arranged in ascending order are sequentially searched.

Figure 12:
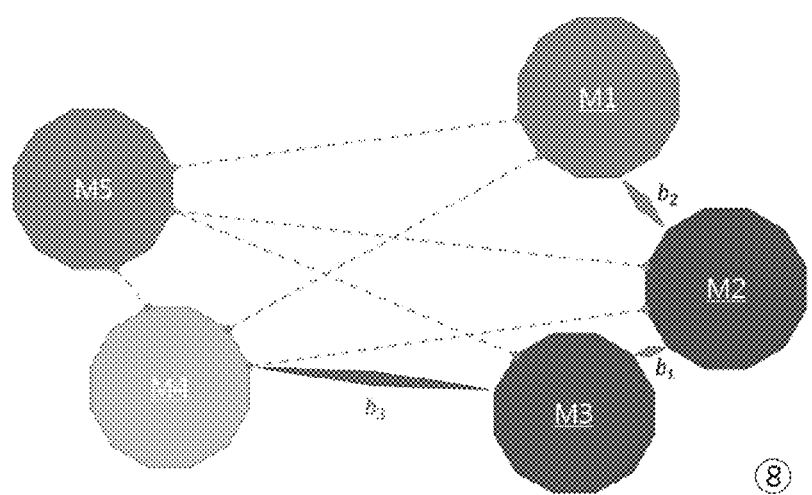

In FIG. 11, a second minimum value p2=min(d3,4) is searched among the updated spaced distances p1 to p7 and a unit bridge b1 is already generated in one (e.g. M3) of the two models corresponding to the searched spaced distance p2=min(d3,4) and a unit bridge is not yet generated in the other model (e.g. M4) so that an additional unit bridge (e.g. b3) may be generated at the position corresponding to the searched spaced distance p2=min(d3,4) as shown in FIG. 12.

Figure 13:
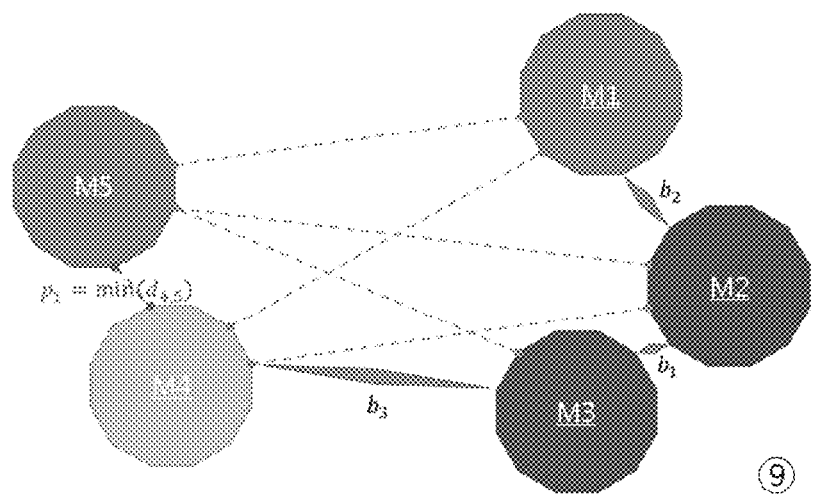
Figure 14:
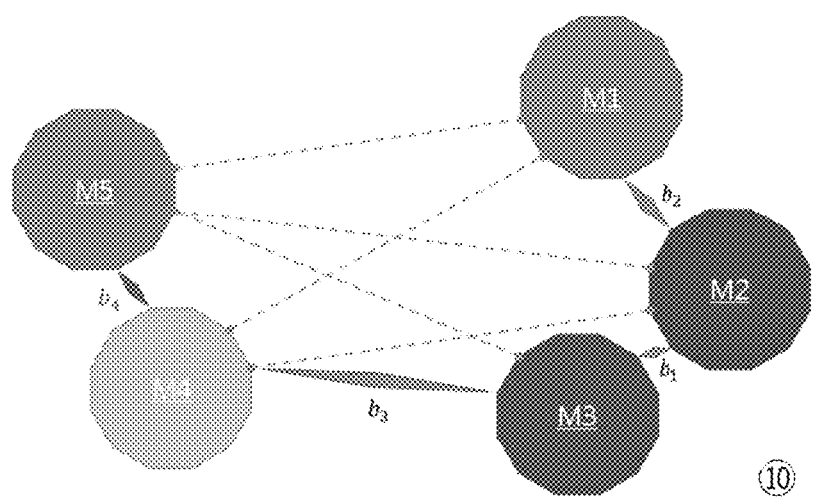
Figure 15:
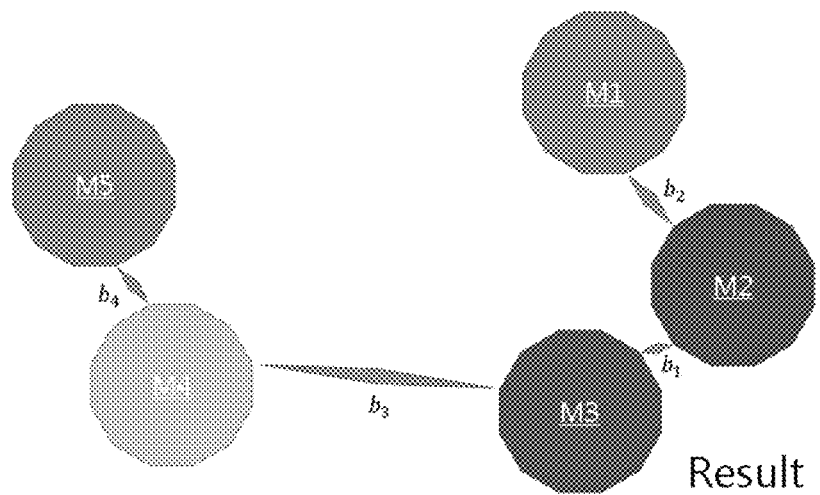

In FIG. 13, a minimum value p1=min(d4,5) is searched among the updated spaced distances p1 to p6 and a unit bridge b3 is already generated in one (e.g. M4) of the two models corresponding to the searched spaced distance p1=min(d4,5) and a unit bridge is not yet generated in the other model (e.g. M5) so that an additional unit bridge (e.g. b4) may be generated at the position corresponding to the searched spaced distance p1=min(d4,5) as shown in FIG. 14.

When Model M4 and Model M5 are connected through the additional bridge b4 in FIG. 14, the five first input models M1, M2, M3, M4 and M5 are all connected by the four unit bridges b1, b2, b3 and b4 so that it is no longer necessary to generate the unit bridge, and generation of the first virtual bridge connecting models spaced apart from each other among the first input models is completed.

Figure 16:
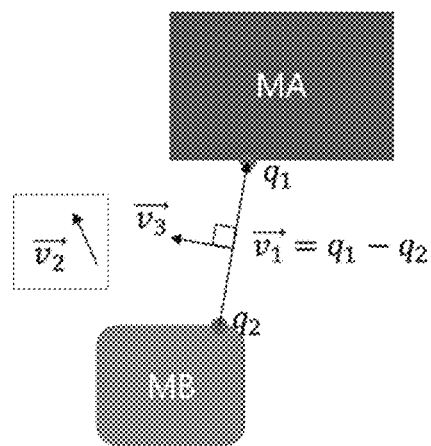
FIGS. 16 and 17 are conceptual diagrams illustrating a shape of the virtual bridge of an embodiment of the present inventive concept.
Figure 17:
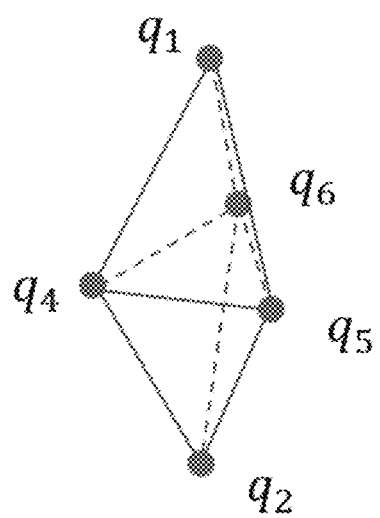

FIGS. 16 and 17 are conceptual diagrams illustrating a shape of the virtual bridge of an embodiment of the present inventive concept.

Referring to FIGS. 1 to 17, the unit bridge which connects two models spaced apart from each other may be a 3D model including the two closest points of the two models spaced apart from each other. For example, the unit bridge may have a triangular bipyramid shape. In the present inventive concept, the shape of the unit bridge may not be limited to the triangular bipyramid. For example, the shape of the unit bridge may be a closed polyhedron that does not intersect the input models.

The shape of the unit bridge of the triangular bipyramid may be defined by $\vec{v}_1$, $\vec{v}_2$ and $\vec{v}_3$. When two models spaced apart from each other are Model MA and Model MB, two closest points between the model MA and the model MB may be defined as q1 and q2. Herein, $\vec{v}_1 = q_1 - q_2$, $\vec{v}_2$ is an arbitrary vector and $\vec{v}_2 = (\vec{v}_1 \times \vec{v}_2) \times \vec{v}_1$.

When $$q_3 = \frac{q_1 + q_2}{2},$$

$$q_4 = q_3 + k\vec{v}_3,$$

q5 is the point where q4 is rotated 120 degrees with the vector $\vec{v}_1$ around q3 and q6 is the point where q4 is rotated 120 degrees with the vector $\vec{v}_1$ around q3, a first triangular pyramid of the triangular bipyramid shape may be defined as q1, q4, q5, and q6, and a second triangular pyramid of the triangular bipyramid shape may be defined as q2, q4, q5, and q6. Herein, k is a constant.

Figure 18:
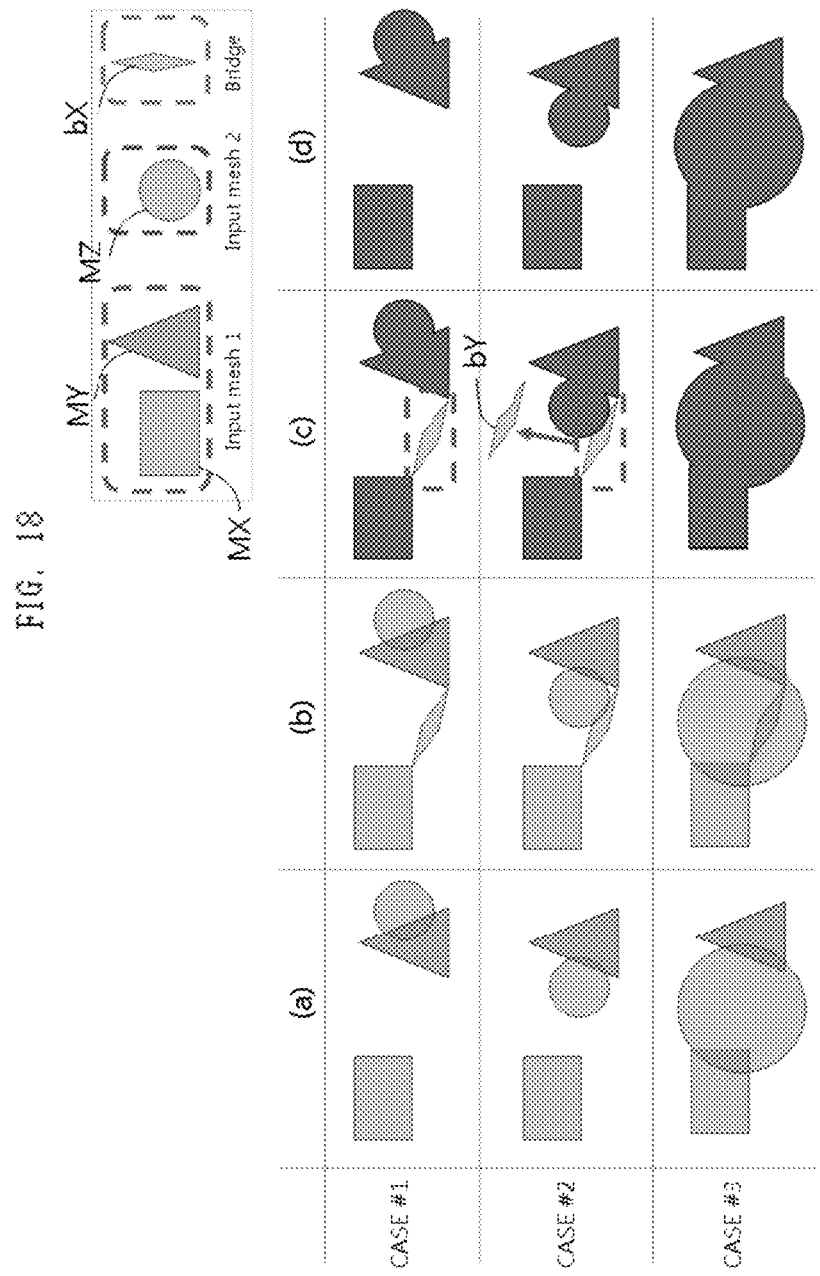
FIG. 18 is a conceptual diagram illustrating a method of removing the virtual bridge of FIG. 17.

FIG. 18 is a conceptual diagram illustrating a method of removing the virtual bridge of FIG. 17.

Referring to FIGS. 1 to 18, the first virtual bridge and the second virtual bridge are temporary structures generated only to connect the input models spaced apart from each other to simplify the Boolean operation on the input models spaced apart from and are not necessary parts for a final model. Thus, when the first virtual bridge or the second virtual bridge remains in the first result model generated by the Boolean operation on the first group model and the second group model, the first virtual bridge or the remaining second virtual bridge may be removed from the first result model.

In FIG. 18, a first input group (Input mesh 1) may include Model MX and Model MY and a second input group (Input mesh 2) may include Model MZ. Herein, the two models MX and MY are spaced apart from each other in the first input group (Input mesh 1) so that a virtual bridge bX connecting the two models MX and MY may be generated.

In FIG. 18, for example, Union operation may be performed on the first input group (Input mesh 1) and the second input group (Input mesh 2).

As shown in CASE #1 of FIG. 18, the virtual bridge bX may entirely remain in the first result model which is generated by the Boolean operation of the first input group (Input mesh 1) and the second input group (Input mesh 2). Herein, the virtual bridge bX entirely remaining in the first result model may be removed to generate the final result model.

As shown in CASE #2 of FIG. 18, the virtual bridge bX may partially remain in the first result model which is generated by the Boolean operation of the first input group (Input mesh 1) and the second input group (Input mesh 2). The partially remaining bridge is represented as bY in FIG. 18. Herein, the virtual bridge bY partially remaining in the first result model may be removed to generate the final result model.

As shown in CASE #3 of FIG. 18, the virtual bridge bX may not remain in the first result model which is generated by the Boolean operation of the first input group (Input mesh 1) and the second input group (Input mesh 2). Thus, herein, a step of removing the virtual bridge bX may be omitted.

According to the present embodiment, the plural models spaced apart from each other are connected using the virtual bridge to perform a multi input Boolean operation at once. Thus, the Boolean operation with a large number of models may be simplified. In addition, it is possible to prevent situations where the desired final result is not obtained because the result of the Boolean operations varies according to the order of the Boolean operations.

Therefore, the Boolean operations on multiple input models occurred in a digital dentistry may be stably performed, a manufacturing process of the 3D model for the digital dentistry may be simplified and an accuracy of the 3D model for the digital dentistry may be enhanced.

Figure 19:
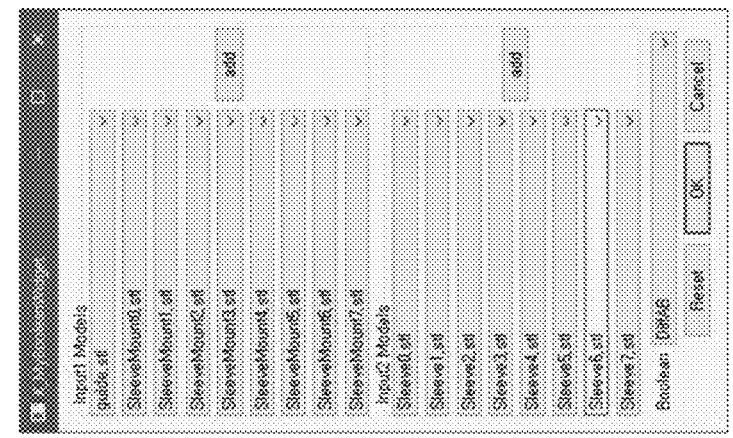
FIG. 19 is a perspective view illustrating input models to generate a 3D model for a digital dentistry using a virtual bridge based multi input Boolean operation according to an embodiment of the present inventive concept.
Figure 19:
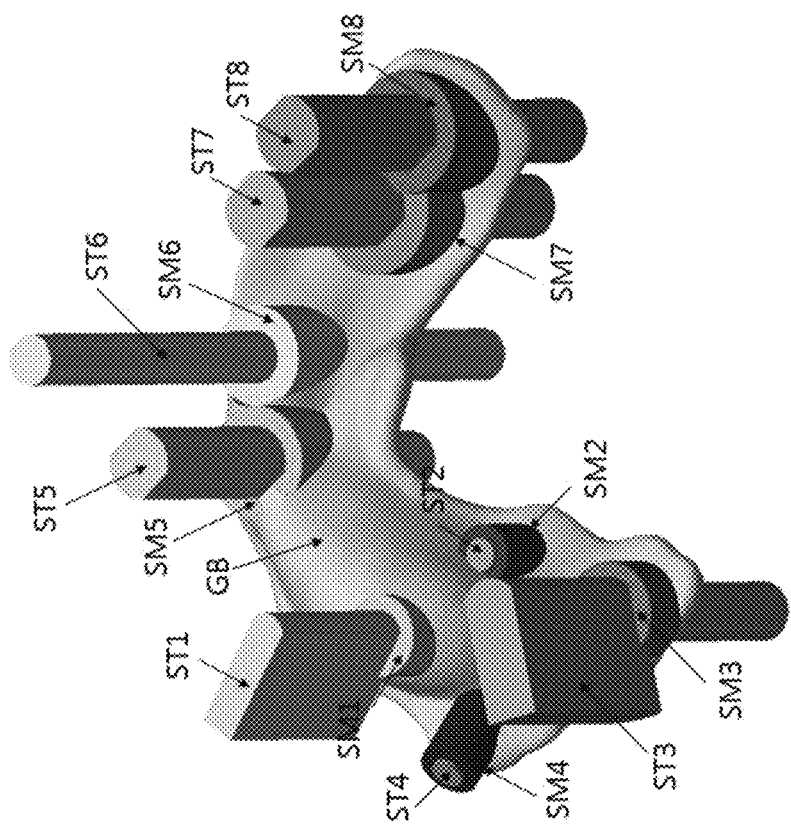
Figure 20:
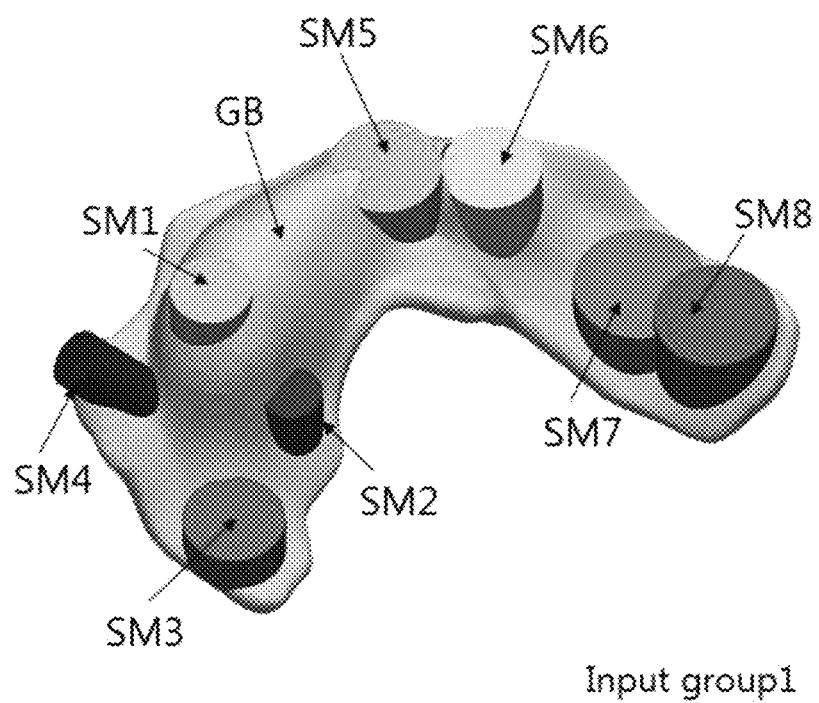
FIG. 20 is a perspective view illustrating a first input group of the input models of FIG. 19.
Figure 21:
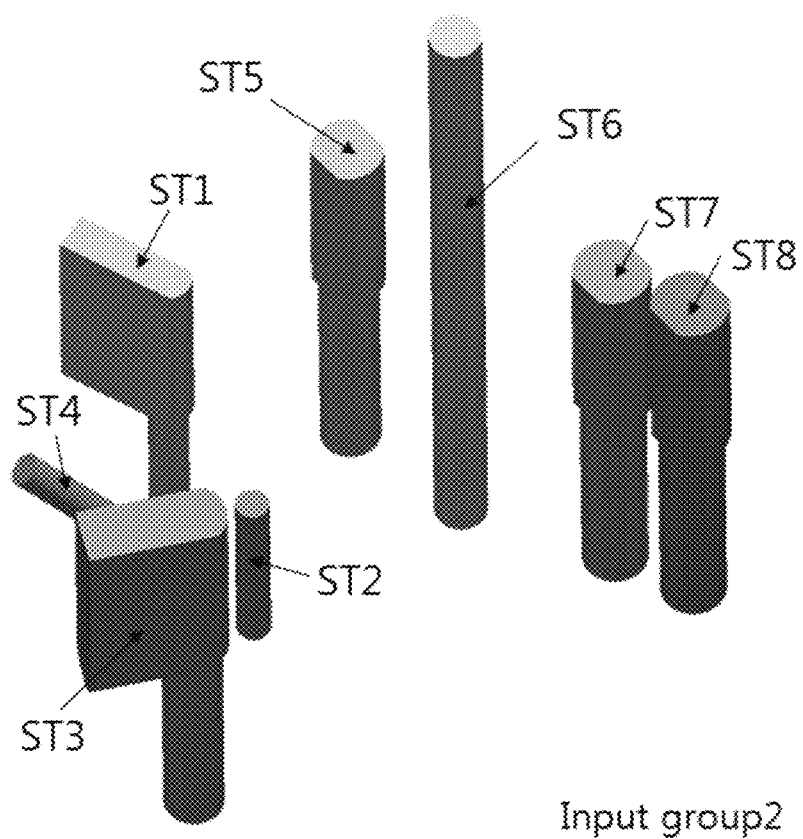
FIG. 21 is a perspective view illustrating a second input group of the input models of FIG. 19.
Figure 30:
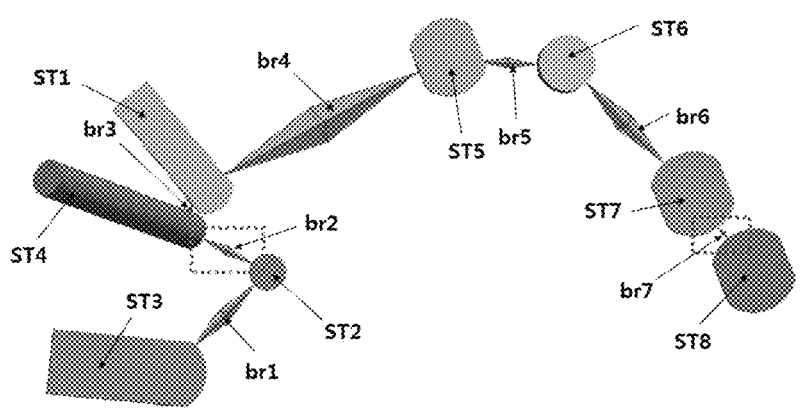
FIGS. 30 to 32 are perspective views illustrating a method of generating a second group model of the second input group of FIG. 21.
Figure 31:
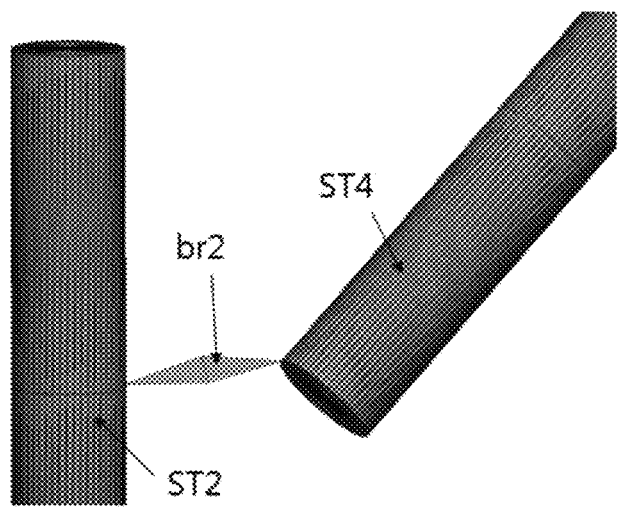
Figure 32:
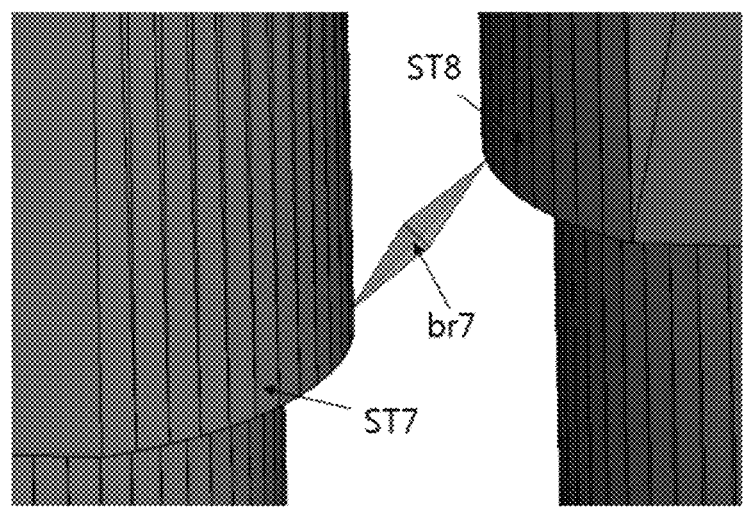
Figure 33:
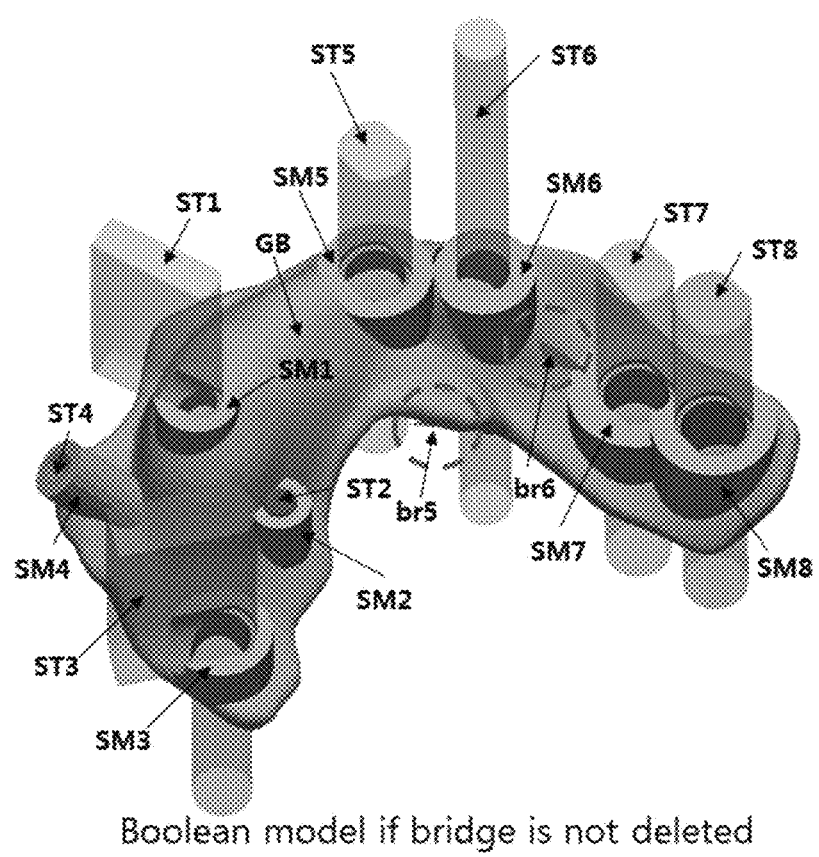
FIGS. 33 and 34 are perspective views illustrating a method of removing virtual bridges from a first result model generated by operating the first group model of FIG. 29 and the second group model of FIG. 30.
Figure 34:
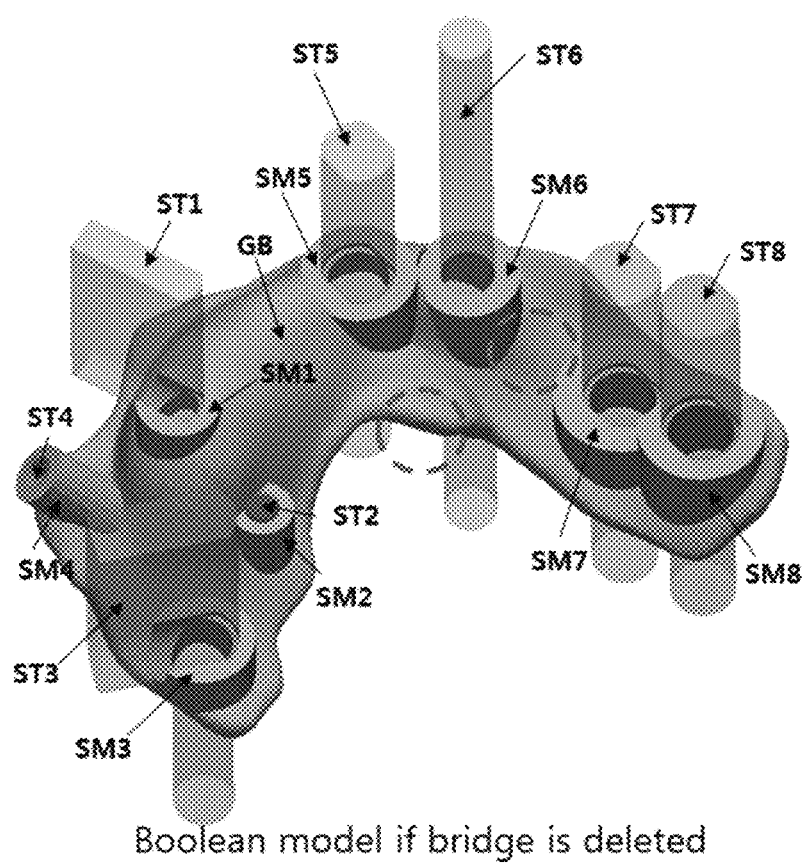
Figure 35:
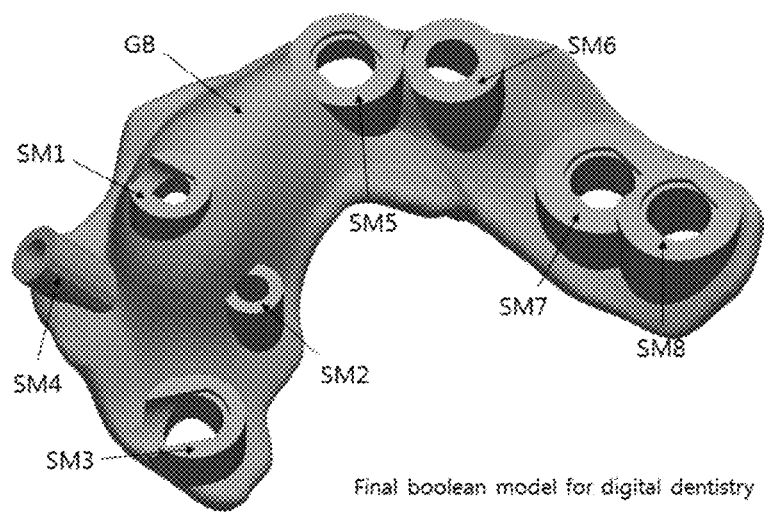
FIG. 35 is a perspective view illustrating a final result model where the virtual bridges are removed from the first result model of FIG. 33.

FIG. 19 is a perspective view illustrating input models to generate a 3D model for a digital dentistry using a virtual bridge based multi input Boolean operation according to an embodiment of the present inventive concept. FIG. 20 is a perspective view illustrating a first input group of the input models of FIG. 19. FIG. 21 is a perspective view illustrating a second input group of the input models of FIG. 19. FIGS. 22 to 29 are perspective views illustrating a method of generating a first group model of the first input group of FIG. 20. FIGS. 30 to 32 are perspective views illustrating a method of generating a second group model of the second input group of FIG. 21. FIGS. 33 and 34 are perspective views illustrating a method of removing virtual bridges from a first result model generated by operating the first group model of FIG. 29 and the second group model of FIG. 30. FIG. 35 is a perspective view illustrating a final result model where the virtual bridges are removed from the first result model of FIG. 33.

Referring to FIGS. 1 to 35, the first input group includes a guide base GB having a shape corresponding to a shape of a patient's teeth to be placed on the patient's teeth, and a plurality of sleeve mounts SM1 to SM8 connected to the guide base GB and protruded from the guide base GB.

The second input group may include a plurality of sleeve tools ST1 to ST8 corresponding to the sleeve mounts SM1 to SM8 and spaced apart from each other.

In software user interface of FIG. 19, guide.stl represents the guide base GB and SleeveMount0.stl, SleeveMount1.stl, SleeveMount2.stl, SleeveMount3.stl, SleeveMount4.stl, SleeveMount5.stl, SleeveMount6.stl and SleeveMount7.stl represent the first to eighth sleeve mounts SM1 to SM8, respectively.

In the software user interface of FIG. 19, Sleeve0.stl, Sleeve1.stl, Sleeve2.stl, Sleeve3.stl, Sleeve4.stl, Sleeve5.stl, Sleeve6.stl and Sleeve7.stl represent the first to eighth sleeve tools ST1 to ST8, respectively.

The guide base GB and the sleeve mounts SM1 to SM8 in the first input group are connected so that the first virtual bridge may not be generated for the first input group.

Unlike the first input group, the sleeve tools ST1 to ST8 in the second input group are spaced apart from each other so that the second virtual bridge may be generated for the second input group.

Figure 22:
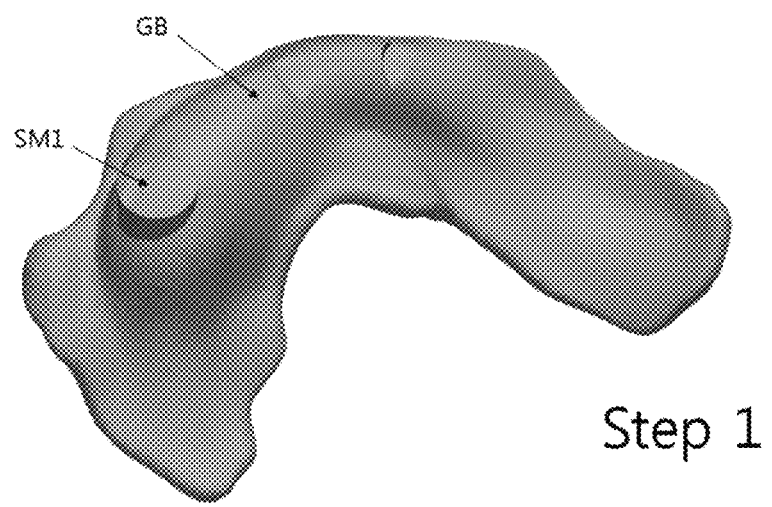
FIGS. 22 to 29 are perspective views illustrating a method of generating a first group model of the first input group of FIG. 20.
Figure 23:
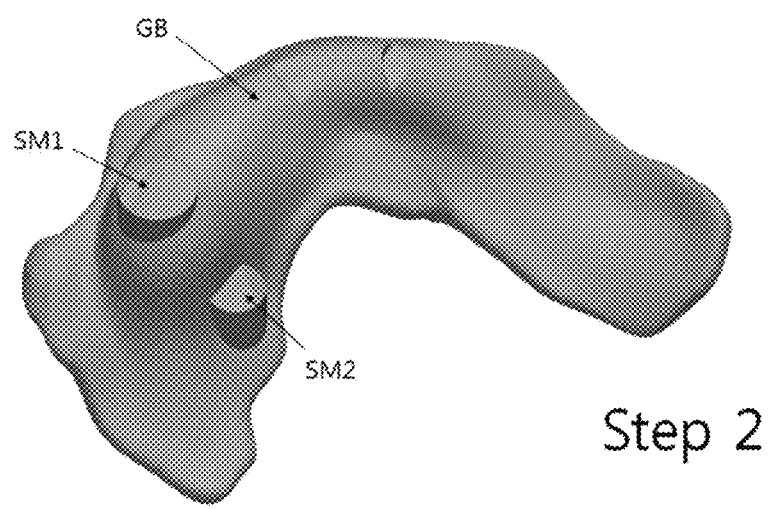
Figure 24:
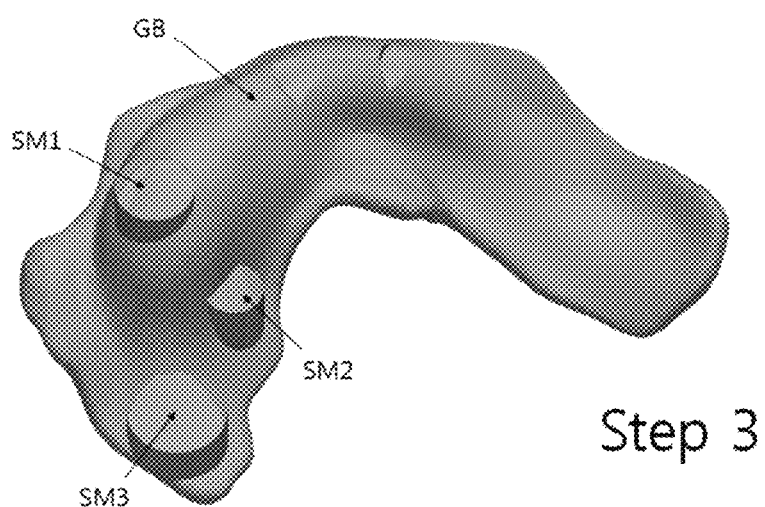
Figure 25:
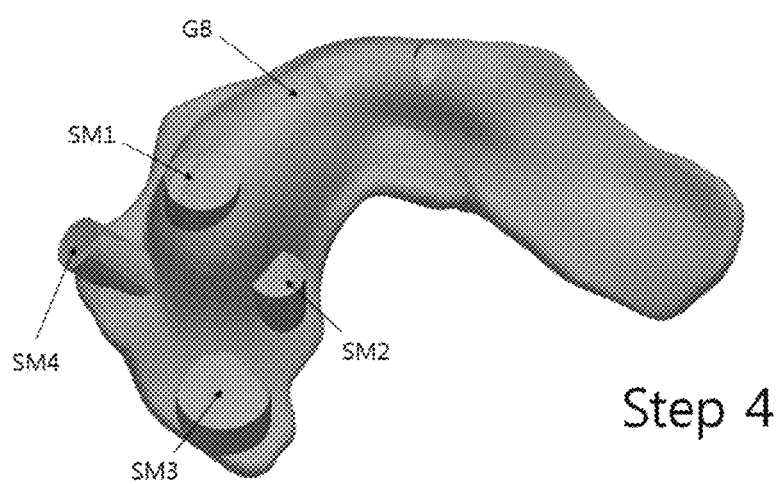
Figure 26:
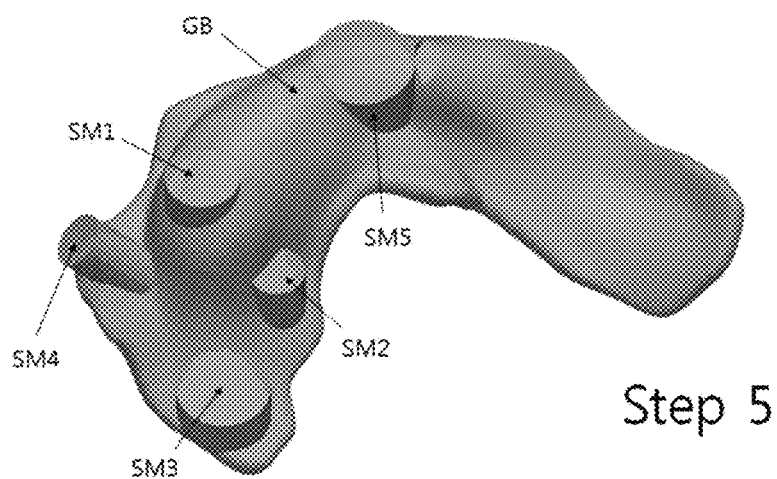
Figure 27:
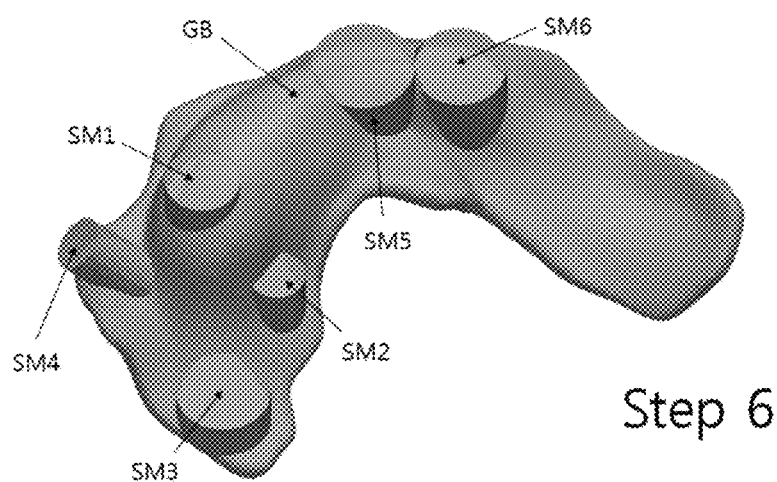
Figure 28:
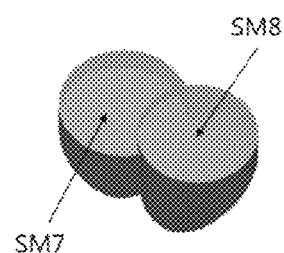
Figure 29:
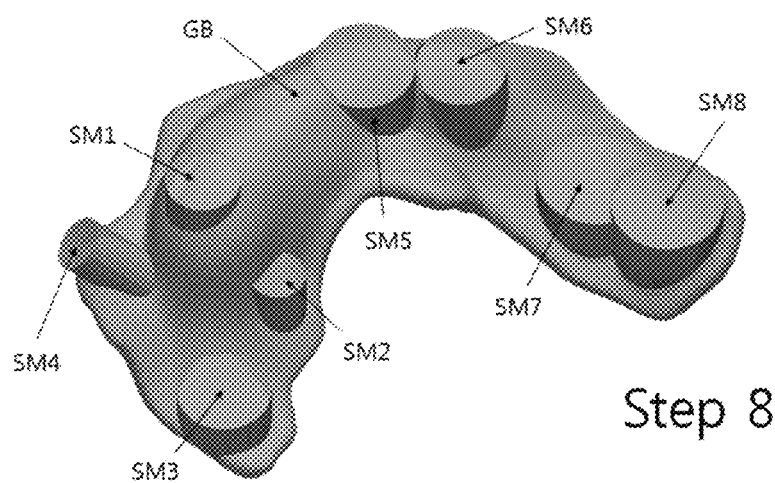

FIGS. 22 to 29 sequentially illustrate the steps of generating the first group model by performing operations on the input models of the first input group. In FIG. 22, Union operation is performed on the guide base GB and the first sleeve mount SM1 to generate a first intermediate model. In FIG. 23, Union operation is performed on the first intermediate model and the second sleeve mount SM2 to generate a second intermediate model. In FIG. 24, Union operation is performed on the second intermediate model and the third sleeve mount SM3 to generate a third intermediate model. In FIG. 25, Union operation is performed on the third intermediate model and the fourth sleeve mount SM4 to generate a fourth intermediate model. In FIG. 26, Union operation is performed on the fourth intermediate model and the fifth sleeve mount SM5 to generate a fifth intermediate model. In FIG. 27, Union operation is performed on the fifth intermediate model and the sixth sleeve mount SM6 to generate a sixth intermediate model. In FIG. 28, Union operation is performed on the seventh sleeve mount SM7 and the eighth sleeve mount SM8 to generate a seventh intermediate model. In FIG. 29, Union operation is performed on the sixth intermediate model and the seventh intermediate model to generate the first group model.

In FIG. 30, a second virtual bridge may be generated between the sleeve tools ST1 to ST8 of the second input group. The sleeve tools ST1 to ST8 may be connected to each other by a plurality of unit bridges br1 to br7 to generate the second group model forming a single element. The unit bridges br1 to br7 may be generated between closest points between models spaced apart from each other.

FIG. 31 illustrates a unit bridge br2 having a shape of a triangular bipyramid and generated between the second sleeve tool ST2 and the fourth sleeve tool ST4. FIG. 32 illustrates a unit bridge br7 having a shape of a triangular bipyramid and generated between the seventh sleeve tool ST7 and the eighth sleeve tool ST8.

A first result model may be generated by performing Difference operation on the second group model generated in FIG. 30 from the first group model generated in FIG. 29 (the first result model=the first group model−the second group model).

The first result model may include the guide base GB and the sleeve mounts SM1 to SM8 disposed on the first result model. Holes corresponding to the sleeve tools ST1 to ST8 may be respectively formed in the sleeve mounts SM1 to SM8.

In FIG. 33, the second virtual bridge of the second group model may remain in the first result model. FIG. 34 represents that the second virtual bridge remaining in the first result model is removed.

FIG. 35 represents a final result model obtained through the Boolean operation of the first group model and the second group model.

Figure 36:
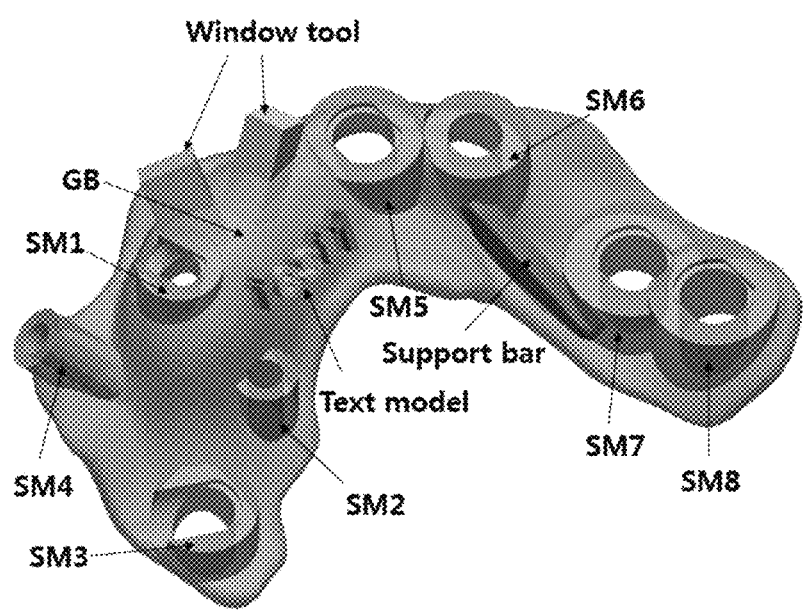
FIG. 36 is a perspective view illustrating input models to generate a 3D model for a digital dentistry using a virtual bridge based multi input Boolean operation according to an embodiment of the present inventive concept.
Figure 37:
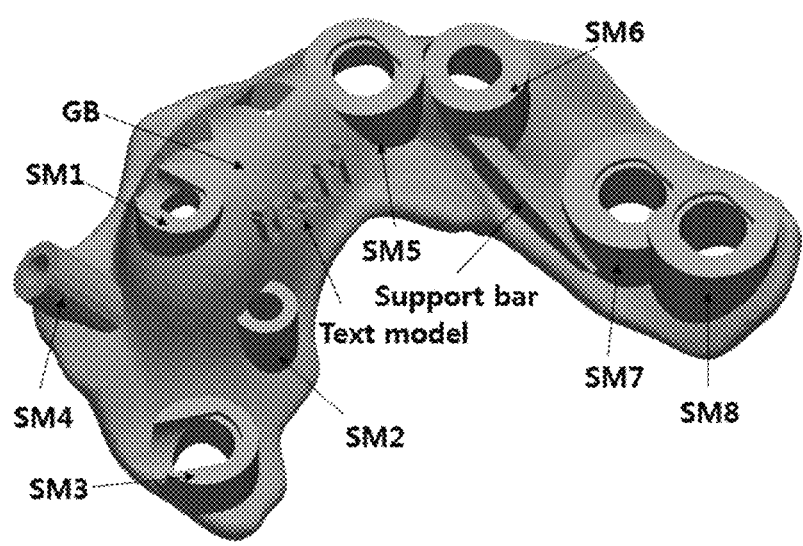
FIG. 37 is a perspective view illustrating a final result model generated by multi input Boolean operation of the input models of FIG. 36.

FIG. 36 is a perspective view illustrating input models to generate a 3D model for a digital dentistry using a virtual bridge based multi input Boolean operation according to an embodiment of the present inventive concept. FIG. 37 is a perspective view illustrating a final result model generated by multi input Boolean operation of the input models of FIG. 36.

FIGS. 36 and 37 illustrate a method of further generating a window tool, a support bar, and a text in the digital dentistry model of FIGS. 19 to 35.

In FIG. 36, the first input group further includes a support bar connected to some (e.g. SM6 and SM7) of sleeve mounts SM1 to SM8. Union operation may be performed on the support bar and the sleeve mounts SM6 and SM7. For example, the support bar may support the sleeve mounts such that the sleeve mounts do not break or bend.

In addition, the first input group further includes a text model disposed on the guide base GB. Union operation may be performed on the text model and the guide base GB. For example, the text model may include information to be recorded about the dentistry model, such as a patient's name, a manufacturing date of a guide and characteristics of the guide.

In addition, the first input group may include a guide base GB having a shape corresponding to a shape of a patient's teeth to be placed on the patient's teeth and the second input group may include a plurality of window tools overlapped with the guide base GB.

The second input group may include the second virtual bridge connecting the window tools spaced apart from each other.

The first result model may be generated by Difference operation on the second group model of the second input group from the first group model of the first input group (the first result model=the first group model−the second group model). The first result model may include the guide base GB. A hole corresponding to the window tool may be formed in the guide base GB. The window tool may be a portion for easily separating the dentistry model from the patient's teeth.

According to an embodiment of the present inventive concept, a non-transitory computer-readable storage medium having stored thereon program instructions of the method of the generating the 3D model for the digital dentistry using the virtual bridge based multi input Boolean operation may be provided. The above mentioned method may be written as a program executed on the computer. The method may be implemented in a general purpose digital computer which operates the program using a computer-readable medium. In addition, the structure of the data used in the above mentioned method may be written on a computer readable medium through various means. The computer readable medium may include program instructions, data files and data structures alone or in combination. The program instructions written on the medium may be specially designed and configured for the present inventive concept, or may be generally known to a person skilled in the computer software field. For example, the computer readable medium may include a magnetic medium such as a hard disk, a floppy disk and a magnetic tape, an optical recording medium such as CD-ROM and DVD, a magneto-optical medium such as floptic disc and a hardware device specially configured to store and execute the program instructions such as ROM, RAM and a flash memory. For example, the program instructions may include a machine language codes produced by a compiler and high-level language codes which may be executed by a computer using an interpreter or the like. The hardware device may be configured to operate as one or more software modules to perform the operations of the present inventive concept.

In addition, the above mentioned method of the generating the 3D model for the digital dentistry using the virtual bridge based multi input Boolean operation may be implemented in a form of a computer-executed computer program or an application which are stored in a storage medium.

The present inventive concept is related to the generating the 3D model for the digital dentistry using the virtual bridge based multi input Boolean operation. The present inventive concept may be applied to various fields of digital dentistry, such as dental appliance design for orthodontic, digital denture design, and a Boolean operation between a digital impression model and a drill guide model when designing a surgical guide for implant surgery.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A method of generating a three dimensional (3D) model for digital dentistry using a virtual bridge based multi input Boolean operation, the method comprising:
generating a first group model by generating a first virtual bridge connecting models spaced apart from each other among first input models of a first input group when the models are spaced apart from each other among the first input models;
generating a second group model by generating a second virtual bridge connecting models spaced apart from each other among second input models of a second input group when the models are spaced apart from each other among the second input models;
generating a first result model by a Boolean operation of the first group model and the second group model; and
removing a remaining first virtual bridge or a remaining second virtual bridge when the first virtual bridge or the second virtual bridge remains in the first result model,
wherein generating the first virtual bridge comprises:
calculating all combinations of closest points between the models spaced apart from each other among the first input models and spaced distances between the closest points between the models spaced apart from each other among the first input models.

2. The method of claim 1, wherein when all of the first input models are connected, the first group model does not include the first virtual bridge,
wherein when all of the second input models are connected, the second group model does not include the second virtual bridge.

3. The method of claim 1, wherein the first virtual bridge is set to connect all of the models spaced apart from each other among the first input models at least once, and minimize a length of a connection path.

4. The method of claim 1, wherein the generating the first virtual bridge further comprises: arranging the spaced distances in ascending order; generating an initial unit bridge at a position corresponding to a minimum value among the spaced distances; and sequentially searching the spaced distances which are arranged in ascending order.

5. The method of claim 4, wherein the generating the first virtual bridge further comprises:
generating an additional unit bridge at a position corresponding to a searched spaced distance when a unit bridge is generated in one of two models corresponding to the searched spaced distance and a unit bridge is not generated in the other model.

6. The method of claim 5, wherein the generating the first virtual bridge further comprises:
not generating an additional unit bridge at a position corresponding to a searched spaced distance when unit bridges are generated in both of two models corresponding to the searched spaced distance.

7. The method of claim 5, wherein the generating the first virtual bridge further comprises:
not generating an additional unit bridge at a position corresponding to a searched spaced distance and setting the searched spaced distance to a bridge candidate position when unit bridges are not generated in both of two models corresponding to the searched spaced distance.

8. The method of claim 1, wherein the generating the first virtual bridge further comprises: generating octrees of the models spaced apart from each other among the first input models to calculate the combinations of the closest points between the models spaced apart from each other among the first input models.

9. The method of claim 1, wherein the spaced distances between the closest points between the models spaced apart from each other among the first input models are represented as $$p = \min_{(i,j) \in C(n,2)} (d_{(i,j)}),$$

where d (i,j) represents a distance between Model i and Model j, the number of the models spaced apart from each other among the first input models is n and C (2,n) represents a combination operation to select two models among the n spaced models.

10. The method of claim 1, wherein a unit bridge connecting models spaced apart from each other among the first input models or the second input models has a triangular bipyramid shape.

11. The method of claim 10, wherein a shape of the unit bridge is defined by $\vec{v}_1$, $\vec{v}_2$ and $\vec{v}_3$, and
   wherein when two models spaced apart from each other are Model a and Model b, two closest points between the model a and the model b are defined as q1 and q2, and
   where $\vec{v}_1 = q_1 - q_2$, $\vec{v}_2$ is an arbitrary vector and $\vec{v}_3 = (\vec{v}_1 \times \vec{v}_2) \times \vec{v}_1$.

12. The method of claim 11, wherein when $$q_e = \frac{q1 + q2}{2}, q_4 = qd + k\vec{v}_3, k$$

is a constant, q5 is a point where q4 is rotated 120 degrees with vector $\vec{v}_1$ around q3 and q6 is a point where q4 is rotated 120 degrees with the vector $\vec{v}_1$ around q3, a first triangular pyramid of the triangular bipyramid shape is defined as q1, q4, q5, and q6 and a second triangular pyramid of the triangular bipyramid shape is defined as q1, q4, q5, and q6.

13. The method of claim 1, wherein the first input group includes a guide base having a shape corresponding to a shape of a patient's teeth to be placed on the patient's teeth, and a plurality of sleeve mounts connected to the guide base and protruded from the guide base, and
   wherein the second input group includes a plurality of sleeve tools corresponding to the sleeve mounts and spaced apart from each other.

14. The method of claim 13, wherein the second input group further includes the second virtual bridge connecting the sleeve tools spaced apart from each other.

15. The method of claim 14, wherein the first result model is generated by Difference operation on the second group model from the first group model, and
   wherein the first result model includes the guide base and the sleeve mounts disposed on the first result model, and
   wherein holes corresponding to the sleeve tools are respectively formed in the sleeve mounts.

16. The method of claim 14, wherein the first input group further includes a support bar connected to the sleeve mounts, and
   wherein Union operation is performed on the support bar and the sleeve mounts.

17. The method of claim 14, wherein the first input group further includes a text model disposed on the guide base, and
   wherein Union operation is performed on the text model and the guide base.

18. The method of claim 1, wherein the first input group includes a guide base having a shape corresponding to a shape of a patient's teeth to be placed on the patient's teeth,
   wherein the second input group includes a plurality of window tools overlapped with the guide base,
   wherein the second input group further includes the second virtual bridge connecting the window tools spaced apart from each other,
   wherein the first result model is generated by Difference operation on the second group model from the first group model,
   wherein the first result model includes the guide base, and
   wherein holes corresponding to the window tools are formed in the guide base.

19. A method of generating a three dimensional (3D) model for digital dentistry using a virtual bridge based multi input Boolean operation, the method comprising:
   generating a first group model by generating a virtual bridge connecting models spaced apart from each other among first input models of a first input group when the models are spaced apart from each other among the first input models;
   generating a first result model by a Boolean operation of the first group model and a second input model; and
   removing a remaining virtual bridge when the virtual bridge remains in the first result model,
   wherein generating the first virtual bridge comprises:
   calculating all combinations of closest points between the models spaced apart from each other among the first input models and spaced distances between the closest points between the models spaced apart from each other among the first input models.

20. A non-transitory computer-readable recording medium having recorded thereon at least one program comprising commands, which when executed by a computer, performs the method of claim 1.

* * * * *